United States Patent [19]

Takahata

[11] Patent Number: 4,539,474
[45] Date of Patent: Sep. 3, 1985

[54] OPTICAL SWITCH FOR AN AUTOMATIC DOOR

[75] Inventor: Yoshiro Takahata, Machida, Japan

[73] Assignee: Hondadenshigiken Co., Ltd., Japan

[21] Appl. No.: 390,330

[22] Filed: Jun. 21, 1982

[51] Int. Cl.³ .............................................. G01V 9/04
[52] U.S. Cl. .................................... 250/221; 250/227
[58] Field of Search ............. 250/221, 227, 209, 214; 340/555, 556

[56] References Cited

U.S. PATENT DOCUMENTS

| | | | |
|---|---|---|---|
| 3,535,528 | 10/1970 | Strickland | 250/221 |
| 3,749,924 | 7/1973 | Vischulis | 250/227 |
| 3,789,384 | 1/1974 | Akers | 250/221 |
| 3,852,592 | 12/1974 | Scoville | 250/221 |
| 4,068,222 | 1/1978 | Treviranus | 250/221 |
| 4,403,142 | 9/1983 | Kondo | 250/221 |

Primary Examiner—David C. Nelms
Assistant Examiner—J. Gatto
Attorney, Agent, or Firm—Brumbaugh, Graves, Donohue & Raymond

[57] ABSTRACT

A passive optical switch for an automatic door for opening and closing a door comprises a light receiving portion provided with a segmented light receiving surface formed by a number of the optical fiber fluxes so as to be adjusted to the focus of a lens, a phototube cell converter portion connected to each of the optical fiber fluxes extending from said light receiving portion, a voltage change detecting portion for detecting the change of an output of said phototube cell converter portion and a direction discriminator circuit for analyzing a detecting signal emitted from said voltage change detecting portion, whereby an automatic opening and closing of a door may be effected by discriminating onward movement of a passing body by detecting the change of an output emitted from said phototube cell converter portion caused by a passing body.

8 Claims, 4 Drawing Figures

OPTICAL SWITCH FOR AN AUTOMATIC DOOR

BACKGROUND OF THE INVENTION

A. Technical Field

The present invention relates to an optical switch for an automatic door, and more particularly to an optical switch for automatically opening and closing a door by optically sensing a passing body, such as a human being passing through a certain area at an entrance of a structure.

B. Description of the Prior Art

Light interrupt switches, radar system switches and acoustic system switches which emit a signal where the human beings pass through are conventionally known. However, a light interrupt switch only senses over a limited area. On the other hand, a radar system switch or an acoustic system switch has a disadvantage in that the area detected is not very discrete or definite, and it has been necessary to provide such switches with a light interrupt switch as an auxiliary switch. Furthermore, the above-mentioned area switches merely indicate the presence of objects, and are not able to discriminate the movement direction of human beings etc. moving within the area.

SUMMARY OF THE INVENTION

It is an object of the present invention to provide an optical system area switch for an automatic door which is able to determine whether or not a door should be opened by sensing when a passing body, such as a human being, approaches an automatic door, without the need for transmitting a special illumination or other known signal.

Another object of the present invention has been attained by a passive optical switch for an automatic door which comprises a light receiving portion having a segmented light receiving surface formed by first ends of a number of optical fiber flux cables positioned so as to be adjusted to the focus of a lens, a phototube cell converter portion connected to second ends of each of the optical fiber flux cables extending from said light receiving portion, a voltage change detecting portion for detecting the change of output of said phototube cell converter, and a direction discriminator circuit for analyzing the detecting signal emitted from said voltage change detecting portion, whereby automatic opening and closing of a door may be obtained by discriminating the onward movement of a passing body as a result of detecting the change of outputs emitted from said phototube cell converter portions caused by a passing body.

DETAILED DESCRIPTION OF PREFERRED EMBODIMENTS

The present invention will be described in more detail with reference to a preferred embodiment as shown in the attached drawings.

Figure 1:
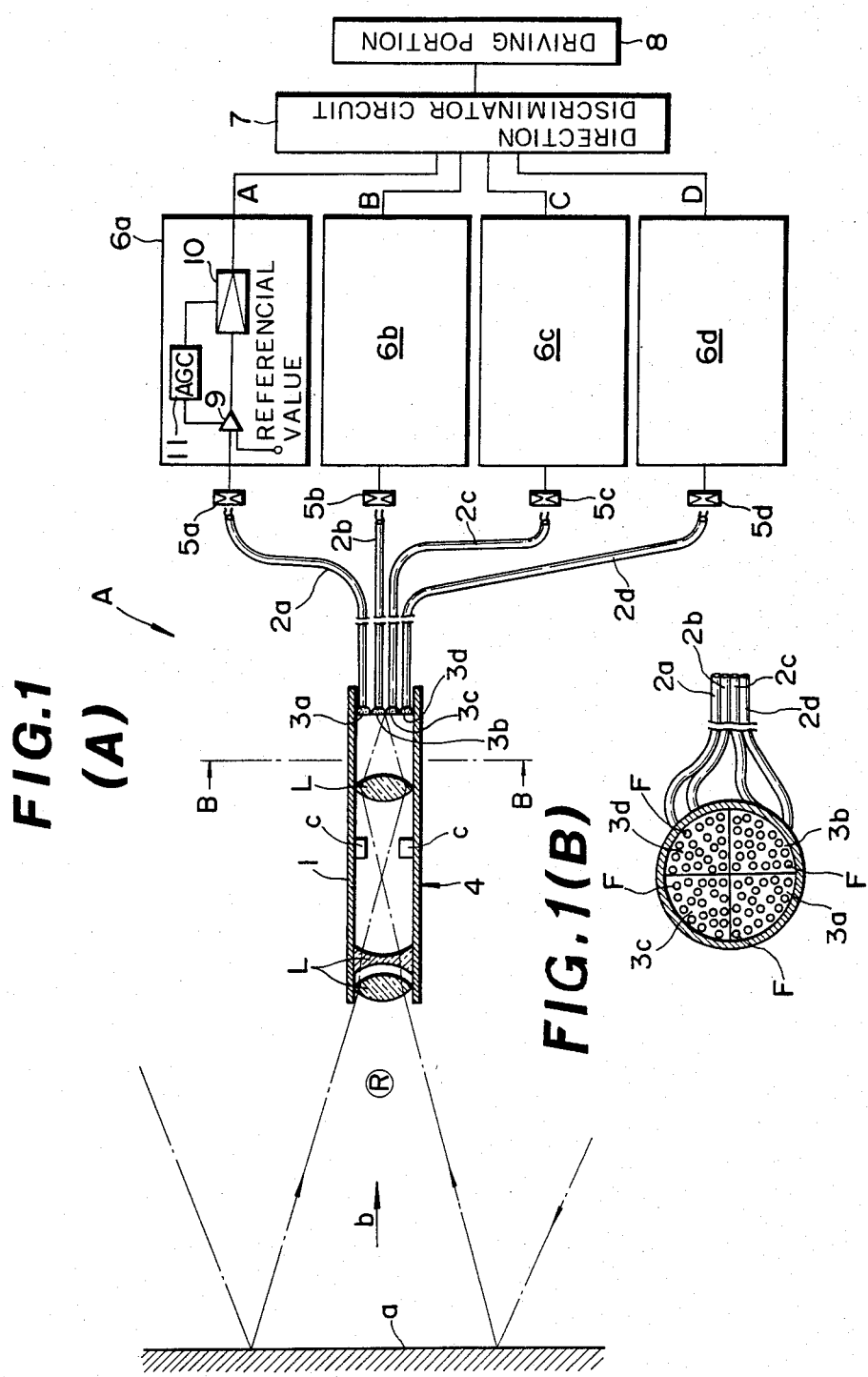
FIG. 1(A) shows the structure of an embodiment with a circuit with reference to an automatic door opening and closing mechanism employing an optical switch according to the present invention.
FIG. 1(B) is an enlarged sectional view taken along line B—B in FIG. 1(A)

FIG. 1 shows a device A for automatic opening and closing a door, employing an optical switch according to the present invention.

The device A for automatic opening and closing a door comprises a light receiving portion 4 which receives the natural optical light or flux b reflecting on a detecting surface a, and converges the light within a lens tube 1. Each of the light receiving surfaces 3a, 3b, 3c and 3d sense the light and comprise groups of the ends F of optical fiber fluxes or cables 2a, 2b, 2c and 2d respectively. Phototube cell converter portions 5a, 5b, 5c and 5d respectively are connected to the optical fiber fluxes 2a–2d extending from said light receiving portion 4. Voltage change detecting portions 6a, 6b, 6c and 6d are provided for detecting the change of an output emitted from said phototube cell converter portion. A direction discriminator circuit 7 is provided for analyzing a detecting signal emitted from said voltage change detecting portion, and a driving portion 8 is provided for causing the opening and closing of a door in response to signals emitted from said direction discriminator circuit.

The lens tube 1 is illustrated in a drawing showing only a lens L and an aperture C therein, but a zoom lens which continuously changes the focal distance while keeping the focus and brightness of a lens constant may be employed. The light receiving surface 3 has a number of optical fiber fluxes and the end edge portions of those optical fibers are grouped in segments to form the light receiving surfaces. (In this example, an explanation will be made with reference to an arrangement wherein the light receiving surface is segmented into four areas with each area being a quadrant of a circle in one plane.) The light receiving surface is positioned and arranged within the lens tube 1 so as to be generally at the focus of the lens L. Accordingly, the focus of a lens is arranged to be adjusted to a detecting surface (e.g. floor surface) in the drawing.

The phototube cell converter portions 5a–5d sense the amount of light (i.e. the illuminance) transmitted to the respective optical fiber fluxes 2a–2d extending from the respective light receiving surfaces 3a–3d, and change electric conductivity (i.e. resistance) in response to the amount of light received.

The voltage change detecting portions 6a–6d each comprise a differential amplifier 9 for sensing the difference between the output voltage of said phototube cell converter portion and a reference value, an amplifier 10 for amplifying the differential output thereof and a forward type AGC (automatic gain control) circuit 11 for maintaining the amplified output of the amplifier 10 relatively constant by controlling the gain of the amplifier 10 in proportion to the differential output of said differential amplifier, so that changes in ambient light conditions are compensated for. Detecting signals A–D which are emitted from the detecting portion may be processed and discriminated to determine onward direction of a passing body by means of a direction discriminator circuit. A driving portion 8 functions to produce a signal to open the door in response to a door opening signal produced by the direction discriminator circuit 7.

The phototube cell converter element of the phototube cell converter portions 5a–5d may comprise CdS (cadmium sulfide), for example. The segmented light receiving surfaces 3a–3d within the lens tube 1 receive incident ultraviolet rays, visible rays, solar rays, and thermal rays, etc. However, since an optical fiber is employed which transmits only visible rays, the fiber performs a filtering function. The sensitivity wavelength of CdS corresponds to the bandpass frequency of the optical fiber.

Figure 3:
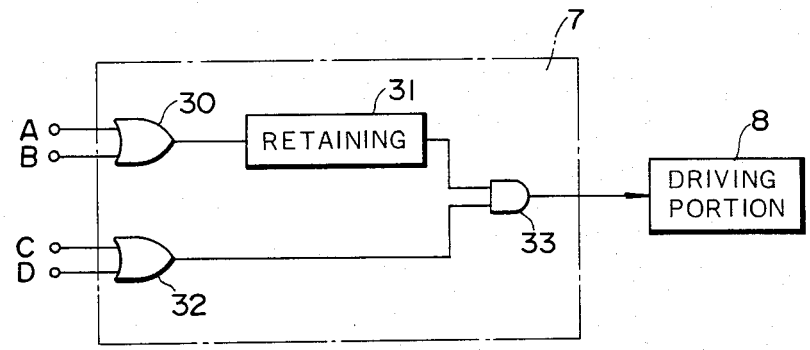
FIG. 3 shows a direction discriminator circuit.

As shown in FIG. 3, the direction discriminator circuit 7 consists of two OR gates 30 and 32, an AND gate 33, and a retaining circuit 31. The retaining circuit or latch 31 provides a high logic at its output in response to a detecting signal A or B supplied through the OR gate 30, and continues to provide this high logic signal for a certain prescribed period after a detecting signal A or B is no longer provided. The high logic signal is supplied to AND gate 33. The AND gate 33 receives a detecting signal C or D supplied through an OR gate 32, and the output of the retaining circuit 31. Of course another circuit may be employed, and the direction discriminator circuit 7 is not limited to the specific circuit described and illustrated.

When visible light is present at an entrance of a structure at a detecting surface a, the lens tube, which preferably has a lens arrangement, receives light from the detecting surface. However, light reflected off the detecting surface a is interrupted when a person comes within a detecting area R, and the amount of light received by the overall light receiving surface decreases. The position of the person in the detecting area R determines which one of the individual light receiving surfaces 3a–3d receives less light. When a light receiving surface receives less light, the illuminance within its associated optical fiber flux decreases. The decrease in illuminance may be sensed as a change in electric conductivity (i.e. resistance) by means of phototube cell converter elements of the phototube cell converter portions 5a–5d which each generate an output voltage in proportion to the amount of light received.

The above-mentioned output voltage is detected as the differential voltage between the reference value by means of a respective differential amplifier 9. When the differential output is amplified by means of a suitable amplifier 10, an AGC circuit 11 may generate a sufficient amplified output variation (because of the incapability of the AGC circuit 11 to quickly adjust the gain in response to the approach of a person). That is, the overall system compensates for changes in ambient or background light conditions, but senses abrupt changes in light, as caused by people approaching.

Figure 2:
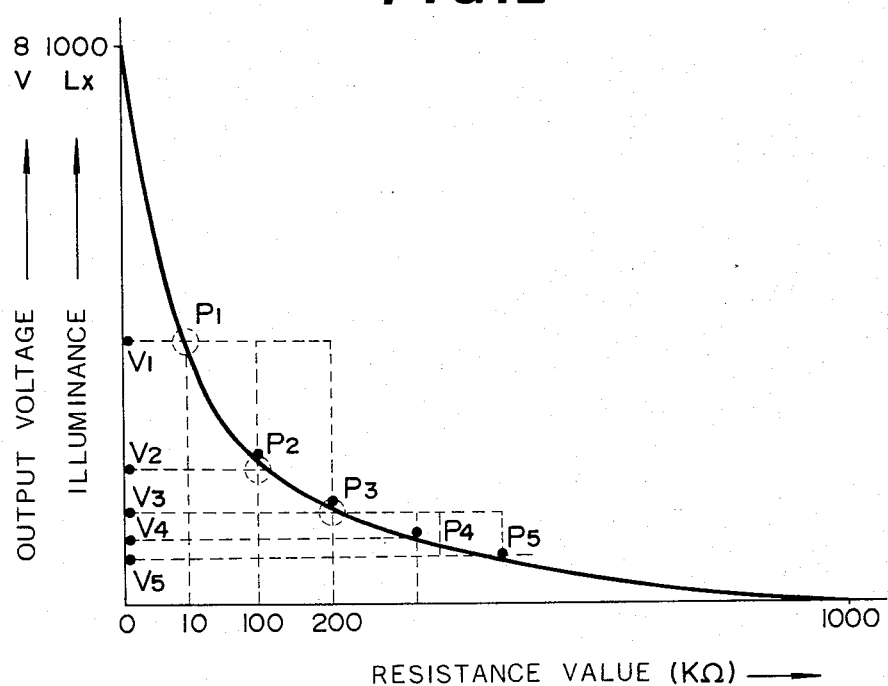
FIG. 2 shows the illuminance vs. the resistance characteristic of a light receiving element.

The relationship between electric conductivity (resistance) and amount of light (illuminance) transmitted from the inside of an optical fiber and a phototube cell converter element (CdS) is shown in FIG. 2. This is illustrated in the form of the illuminance vs. resistance characteristic curve for a light receiving element. Now, assuming that the light received by phototube cell converter portion is at the P1 point, the output voltage of the phototube cell converter portion at that time is VR=V1. When a person comes forward within the detecting area, the illuminance varies from the V1 point to the V2 point and the VR voltage varies from V1 to V2 accordingly.

The amount of light received by the optical fiber fluxes varies constantly depending on the ambient conditions of daily rate and weather etc. Therefore, when a regular differential output of the differential amplifier 9 increases in response to the increase of an amount of light, the AGC circuit 11 lowers the gain of the amplifier 10 so as to adjust to a reference level thereof. In a similar manner, the AGC raises the gain when the amount of light decreases.

However, when a human being comes within the detecting area and the amount of light received by a segmented light receiving surface changes suddenly, an amplified output variation occurs, and one or more detecting signals at A-D respectively are generated at the respective differential voltage detecting portions 6a–6d. Accordingly, when a detecting signal at A or B is generated at the inputs of direction discriminator circuit 7, the retaining circuit 31 is actuated through the OR gate 30 so that one of the inputs of the AND gate 33 goes to the High logic level. When a detecting signal at C or D is generated within a prescribed time even after the extinction of a detecting signal at A or B, the other input of the AND gate 33 goes to the High level, thereby providing a signal for opening a door to the driving portion 8.

When a person passes only through the detecting area associated with the light receiving surfaces 3a and 3b, the output of the AND gate 33 remains at a Low level and a signal for opening a door to the driving portion 8 is not generated. Likewise, when a signal passes only through the detecting area associated with light receiving surfaces 3c and 3d, the output of the AND gate 33 remains at a Low level, and no signal is generated for opening a door. Also, when a person first passes through the detecting area associated with the light receiving surfaces 3c or 3d and then passes through the detecting area associated with the light receiving surfaces 3a or 3b, a signal for opening a door is not generated because a High level signal from the retaining circuit 31 is not supplied to the AND gate 33 at the same time a detecting signal at C or D is generated.

In short, the signal for opening a door is generated from the direction discriminator circuit 7 only when a person passes through the detecting area in a predetermined, onward direction. This will first cause less light to be received by light receiving surfaces 3a or 3b, and then cause less light to be received by the light receiving surfaces 3c or 3d. In order to improve the accuracy of the testing or sensing, the output condition of the voltage change detecting circuit may be scanned by means of a sequence circuit under a certain prescribed scanning cycle. In this manner, a forward direction movement may be ascertained upon a change in the pattern of memory data which is obtained by storing memory data at addresses with each address corresponding to each of the light receiving surfaces 3a, 3b, 3c and 3d. Also, the number of light receiving surfaces in both the vertical and transversal directions can be increased, and a microcomputer can be utilized. In this case, data such as the number of persons passing through the sensing area may also be obtained as the occasion demands.

In accordance with the present invention, an area switch may also be provided wherein a detecting portion is fixed relative to some portion on the head of a person by exposing only an opening end portion of a lens tube in order to receive the light. In this manner, such a lens tube can be adjusted to the focal distance of a lens, and an amount of light (i.e. the illuminance), even when the height of a detecting surface and the light receiving portion varies. The above-mentioned switch has a detecting area larger than a conventional area switch. Also, it is not necessary to actively transmit sensing signals. Furthermore the switch is accurately actuated regardless of the speed of a pedestrian. Also, the switch may be used in conjunction with a double door having either one side or both sides opening, or any other kind of doors. Still further, any erroneous operation is substantially reduced by discriminating against false detection signals owing to outdoor noise, change of outdoor temperature, degree of moisture and advancement of water.

Still further, when using a conventional automatic door device, false actuations may occur when such a device is employed with conventional entrance and exit automatic doors, but an erroneous operation will not occur when employing a switch according to the present invention, even when the same device is employed at the entrance and exit.

Since the switch according to the present invention actuates in response only to the change in the amount of light on the detecting surface in a passive manner, maintenance may be simplified and reliability and quality may also be improved. In addition, by using the switch according to the present invention, it is possible not only to discriminate a forward direction of human beings etc. but at the same time it is also possible to compute the number of persons traveling in the forward direction.

What is claimed is:

1. A passive optical switch for an automatic door for automatically opening and closing a door, by sensing the direction of movement of passing bodies within a sensing area, comprising:

light receiving means having at least two groups of optical fiber cables, each group having first and second ends, the first ends forming light receiving surfaces, wherein each surface is positioned to receive light from a different portion of a sensing area;

phototube cell converter means, conncected to the second ends of the optical fiber cables, for producing a separate indication signal, for each light receiving surface, which has a characteristic indicative of the intensity of light received by that light receiving surface; and direction discriminator circuit means for receiving said separate indication signals and for producing a control signal for driving an automatic door in response to a passing body being sensed in one sensing area portion after being sensed in another sensing area portion, as indicated by the characteristics of said separate indication signals.

2. The optical switch as set forth in claim 1 wherein the light receiving means comprises a tube having a lens arrangement for directing light in the sensing area portions to the light receiving surfaces.

3. The optical switch as set forth in claim 1 wherein light receiving surfaces are provided in two groups, one first group for sensing light in a first sensing area portion a certain distance away from the door to be controlled, and one second group for sensing light in a second sensing area portion located further from the door to be controlled than said first sensing area portion.

4. The optical switch as set forth in claim 3 wherein four light receiving surfaces are provided in two groups, with two light receiving surfaces in each group.

5. The optical switch as set forth in claim 4 wherein the light receiving surfaces comprise four separate quadrants in a generally circular planar arrangement.

6. The optical switch as set forth in claim 1 further including means for comparing the characteristics of the separate indication signals to a reference limit and for modifying the magnitude of a characteristic in response to the steady state change of said characteristic from said reference limit, to maintain a relatively constant difference therebetween, to thereby compensate and adjust for ambient light conditions in said sensing area portions.

7. The optical switch as set forth in claim 1 wherein the direction discriminator circuit means comprises a latch means for receiving separate indication signals from one sensing area portion and for providing a detecting signal at the output thereof for a predetermined time after a passing body is sensed in said sensing area portion as indicated by the characteristic of said indication signal; and gate means for receiving the output of said latch means and for receiving separate indication signals from the other sensing area portion, and for providing a control signal in response to receiving a detecting signal from said latch means when the characteristic of a separate indication signal from one other sensing area portion indicates a passing body in said portion.

8. The optical switch as set forth in claim 7 wherein the latch means receives indication signals from a sensing area portion located further, from the door to be controlled, than the other sensing area portions.

* * * * *